United States Patent
Keats et al.

(10) Patent No.: US 6,820,120 B1
(45) Date of Patent: Nov. 16, 2004

(54) ROUTING OF DATA PACKETS IN HETEROGENEOUS NETWORKS

(75) Inventors: Bruce D. Keats, Kanata (CA); Brian E. Stanke, Ottawa (CA); Peter J. Barry, Kilmore (IE)

(73) Assignee: Nortel Networks Limited, Montreal (CA)

(*) Notice: Subject to any disclaimer, the term of this patent is extended or adjusted under 35 U.S.C. 154(b) by 585 days.

(21) Appl. No.: 09/662,589

(22) Filed: Sep. 15, 2000

(51) Int. Cl.[7] .............................................. G06F 15/173
(52) U.S. Cl. ...................... 709/223; 709/238; 709/236; 709/248
(58) Field of Search ................................. 709/223, 228, 709/230, 234, 235, 236, 240, 247, 225, 238; 370/85.13; 395/200

(56) References Cited

U.S. PATENT DOCUMENTS

| | | | | |
|---|---|---|---|---|
| 5,309,437 A | * | 5/1994 | Perlman et al. | 370/401 |
| 5,430,727 A | * | 7/1995 | Callon | 370/401 |
| 5,640,394 A | * | 6/1997 | Schrier et al. | 370/389 |
| 5,896,383 A | * | 4/1999 | Wakeland | 370/400 |
| 5,905,873 A | * | 5/1999 | Hartmann et al. | 709/249 |
| 5,966,545 A | * | 10/1999 | Hanif et al. | 710/11 |
| 6,018,524 A | * | 1/2000 | Turner et al. | 370/392 |
| 6,047,002 A | * | 4/2000 | Hartmann et al. | 370/466 |

OTHER PUBLICATIONS

R. Callon, "Use of OSI IS–IS for Routing in TCP/IP and Dual Environments", Digital Equipment Corporation, Network Working Working Group; Request for Comments 1195, Dec. 1990, pp 1–85.

* cited by examiner

*Primary Examiner*—Hosain Alam
*Assistant Examiner*—Ben Bruckart (57) ABSTRACT

An modified router provides for routing of data packets in heterogeneous networks and provides particular benefit to networks that comprise network elements transmitting predominately IP messages. These modified routers may, in some instances, run software implementing portions of the OSI routing protocol and software implementing the IP routing protocol simultaneously. Further, these modified routers provide for the exchange of routing information between software implementing these two protocols. This exchange of information enables a modified router to run both protocols with limited overhead. The modified routers may initially run only the IP routing protocol and only commence simultaneous use of the OSI routing protocols if, and when, the router receives an OSI trigger (e.g., an ES-IS Hello or IS-IS Hello). On receipt of an OSI trigger, the router may determine its nearest OSI neighbors using the IP routing table. Whenever there is a change in the IP routing table or, if desired, after a specified time out period, a router running the OSI routing protocol may re-determine its nearest neighbors or cease running the OSI routing protocol.

13 Claims, 9 Drawing Sheets

ROUTING OF DATA PACKETS IN HETEROGENEOUS NETWORKS

FIELD OF THE INVENTION

The present invention relates to routing data packets in heterogeneous networks and, in one aspect, to a method for routing Open Systems Interconnect (OSI) data packets over Internet Protocol (IP) networks.

BACKGROUND TO THE INVENTION

As persons skilled in the art will appreciate, many conventional data networks, such as, for example, Synchronous Optical Network (SONET) or Synchronous Digital Hierarchy (SDH) networks, use the OSI protocol to enable communication between network elements.

In an OSI network there are four significant architectural entities: hosts (also known as End Systems), areas, backbones, and domains. A domain is any portion of an OSI network that is under common administrative authority and is similar in concept to an IP Autonomous System (AS). Within any OSI domain, one or more areas can be defined. An area is a logical entity; it is formed by a set of contiguous routers and the data links that connect them. All routers in the same area exchange information about all of the hosts that they can reach.

Areas are connected by level 2 routers (described below) which together form a backbone of the domain. All routers on the backbone know how to reach all areas. The term end system (ES) refers to any non-routing host or node; intermediate system (IS) refers to a router. These terms are the basis for the OSI End System-to-Intermediate System (ES-IS) (described in ISO 9543, available from the International Organization for Standardization (ISO) at www.iso.ch, the contents of which are hereby incorporated herein by reference) and Intermediate System-to-Intermediate System (IS-IS) (described in ISO 10589, "Intermediate system to Intermediate system intra-domain routing information exchange protocol for use in conjunction with the protocol for providing the connectionless-mode Network Service (ISO 8473)" also available from the ISO, the contents of which are hereby incorporated herein by reference) protocols.

Routing can be divided into two categories or levels: level 1 routing refers to intra-area routing; while level 2 routing refers to inter-area routing. An IS (i.e., a router) that can only perform intra-area routing is referred to as a level 1 IS. Similarly, an IS capable of inter-area (or intra-domain) routing is considered to be a level 2 IS.

As a result of their functionality, a level 1 IS need only be aware about the level 1 ISs and ESs within its area and the nearest level 2 IS should a packet received by a level 1 IS require inter-area routing. In contrast, a level 2 IS must be aware of the topology of the area it serves (i.e., the level 1 ISs and ESs in the area); the other level 2 ISs within its domain; and how to reach all other areas within its domain.

IS-IS routing is the standard intra-domain (i.e., inter-area) routing protocol in the OSI protocol suite. The IS-IS routing protocol, being a link state protocol, requires each IS running the IS-IS protocol to determine (e.g., "meet") each of its neighbors and assess the state of each link between itself and its neighbors. This information is stored in a link state circuit table which is used to generate Link State Advertisements or Packets (LSPs) which are transmitted or flooded across the network to each IS. A circuit identifies a logical connection or channel over which communication can occur. LSPs are transmitted whenever an IS determines that there has been change in a link between itself and a neighboring IS. For example, an IS transmits LSPs when it is determined that a link has failed or changed with respect to the link's cost metric (hereinafter "costs"), or when a new neighbor is discovered. Only those routers which are directly connected to each other can form an adjacency and become "nearest neighbours" (i.e. neighboring routers must be directly adjacent to each other and share a common data link).

On receipt of these LSPs, an IS is able to determine a complete picture of the domain topology and compute optimal routes to each ES in the domain. The routing algorithm used by IS-IS is the Shortest Path First (SPF) algorithm.

Other information is also included in the LSPs transmitted and received by the ISs. For example, LSPs also include costs associated with the use of each link. As a result, costs associated with the optimal routes can also be calculated. Further, LSPs include sequence number and remaining lifetime fields which are used to determine if a duplicate LSP has been received, whether the link information is too old, etc.

While OSI compliant networks are popular and quite common, the use of IP networks has proliferated and continues to gain in popularity. As a result, there is a need to enable the co-existence of these two networking protocols. Accordingly, a protocol (often referred to in the art as "Integrated IS-IS") has been developed to enable routers to support both the IS-IS and IP routing protocols. Integrated IS-IS (described in Request For Comment (RFC) 1195, available from the Internet Engineering Task Force (IETF) and available at www.ietf.org, the contents of which are hereby incorporated herein by reference) provides for the routing of IP packets by simply using existing IS-IS packets with the addition of IP-specific fields. Accordingly, each IS router need only run the OSI Integrated IS-IS routing protocol to provide for the routing of IP packets. Use of Integrated IS-IS routing protocol has been reasonably successful in the past in addressing the needs of heterogeneous networks which have been comprised of predominately OSI network elements (i.e., elements transmitting OSI-compliant packets) with small numbers of IP network elements.

However, the relatively recent widespread adoption of IP networking technology has resulted in heterogeneous networks which have, to a larger extent than previous, relatively large numbers of IP network elements. This increase in IP network elements combined with an increase in the number of IP packets being transmitted (and, thus, requiring routing) has demonstrated that the use of Integrated IS-IS in these heterogeneous networks is somewhat inefficient. For example, Integrated IS-IS, while providing the routing protocol, does not provide the forwarding functionality. This results in each protocol stack still being responsible for the forwarding of packets. IP routing using Integrated IS-IS routers is also limited to those IP sub-networks which are contained within a single OSI area. If multicasting capability is desired, Integrated IS-IS requires a router to run a separate multicasting protocol which results in further overhead and degradation of performance. Moreover, many data transmissions require exterior routing (i.e., routing between domains) which, in the Integrated IS-IS protocol, is simply not as well developed as IP exterior routing. Further, it has been noted that Integrated IS-IS does not scale well due to L2 router connectivity requirements.

Other attempted solutions to provide OSI and IP routing run software implementing the complete OSI and IP routing protocols completely independently from one another (often referred to as the Ships In the Night (SIN) method). However, this method has not been satisfactory due to the increased computational overhead required to run two separate and independent protocols.

Accordingly, providing a manner for the routing of data packets in heterogeneous networks which addresses these shortcomings is desirable.

SUMMARY OF THE INVENTION

Advantageously, embodiments of the present provide improved routing of data packets in heterogeneous networks especially in networks that comprise network elements transmitting predominately IP messages. Specifically, routers embodying aspects of the present invention may, in some instances, run software implementing portions of the OSI routing protocol and software implementing the IP routing protocol simultaneously. Moreover, these embodiments provide for the exchange of routing information between software implementing these two protocols.

In one embodiment, routers initially run only the IP routing protocol and a router will only commence simultaneous use of the OSI routing protocols if, and when, the router receives an OSI routing protocol data packet (e.g., an ES-IS Hello—ESH—or IS-IS Hello—ISH) or other OSI trigger. On receipt of an OSI trigger, the router determines, using other aspects of the present invention, its nearest OSI neighbours using the IP routing table. Whenever there is a change in the IP routing table or, if desired, after a specified time out period, a router running the OSI routing protocol may re-determine its nearest neighbours. As only those routers receiving OSI routing packets need run the OSI routing protocols, there is no need for the increased overhead associated with running Integrated IS-IS at each router in the domain.

Moreover, some embodiments of the present invention may, after failing to receive OSI packets for a period of time, cease running the OSI routing protocol. These embodiments result in only those routers "actively" receiving OSI packets running software implementing both the OSI routing and IP protocols with the remaining routers running only the IP routing protocols. Embodiments of the invention provide advantages (e.g., lower overhead) when compared to the SIN method. Further, aspects of the invention are not limited to interior routing only, as is the case with Integrated IS-IS.

In one aspect of the invention there is provided a method for routing data packets complying with a first or a second routing protocol over a heterogeneous network complying in part with said second routing protocol, the method comprising: if a packet received complies with said first routing protocol, determining, according to said first routing protocol, a destination on said heterogeneous network; and routing said packet received to said destination on said heterogeneous network, said routing using said second routing protocol.

In a further aspect of the invention there is provided an Internet Protocol (IP) router forming part of a heterogeneous network formed, in part, by an IP network, said IP router adapted to: receive a packet conforming with one of Internet Protocol and a different protocol; if said packet received conforms with said different protocol, temporarily running said different protocol to determine routing for said packet received; and routing said packet over said IP network responsive to said routing determined whenever there is no end-to-end route through said heterogeneous network complying with said different protocol.

In a further aspect of the invention there is provided a method for routing a packet according to first routing protocol over a heterogeneous network using a second routing protocol, said method comprising: receiving said packet; running said first routing protocol; determining a route for said packet received using said first routing protocol and said second routing protocol; routing said packet received over said heterogeneous network according to said route determined; and ceasing said running of said first routing protocol.

In a further aspect of the invention there is provided a method for routing Open Systems Interconnect (OSI) compliant packets over an Internet Protocol (IP) data network with an IP router, said method comprising: temporarily running OSI routing protocol on said IP router; determining a route for said OSI compliant packets using IP routing information; and transmitting said OSI compliant packets over said IP data network in accordance with said route determined.

In a further aspect of the invention there is provided a computer readable media containing instructions to adapt an Internet Protocol (IP) router to: on receipt of Open Systems Interconnect (OSI) compliant packets, temporarily operate OSI routing protocol on said IP router; determine a route for said OSI compliant packets using IP routing information; and transmitting said OSI compliant packets over said IP data network in accordance with said route determined.

In a further aspect of the invention there is provided a method of identifying a first router's nearest neighbouring routers from a plurality of routers, the first router and the plurality of routers forming part of a packet switched data network, said method comprising: transmitting a request over said packet switched data network to at least some of said plurality of routers; for each of said some of said plurality of routers receiving said request: determining whether said request was received over said packet switched data network on an optimal route; and if said request was received over said packet switched data network on an optimal route then transmitting a response to said request to said first router identifying said router transmitting said response as a nearest neighbouring router to said first router.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood with reference to the following detailed description read in conjunction with the drawings, in which.

DETAILED DESCRIPTION OF THE PREFERRED EMBODIMENTS

Figure 1:
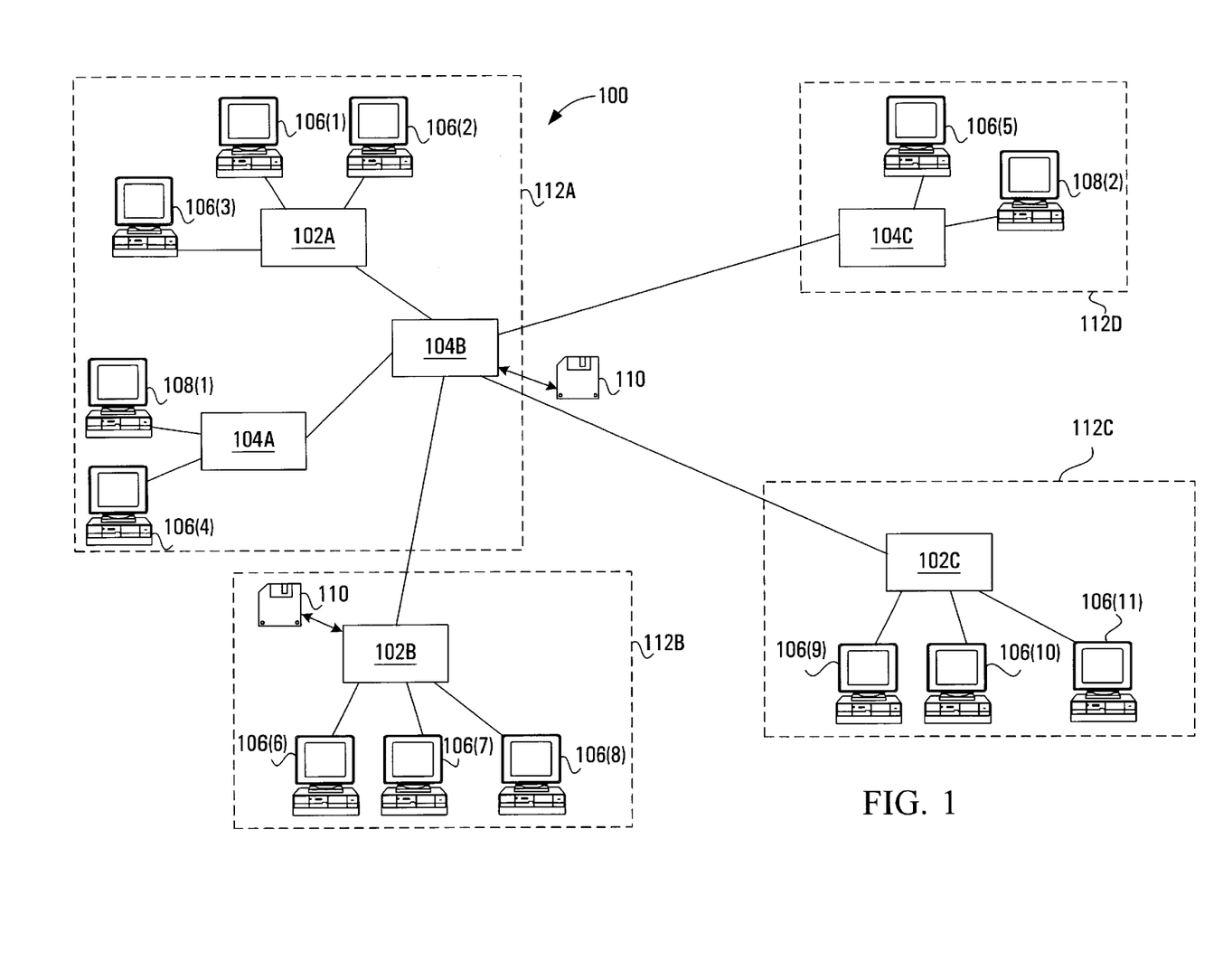
FIG. 1 is a block diagram of a packet switched data network including routers embodying aspects of the present invention.

FIG. 1 illustrates an exemplary heterogeneous packet switched data network 100. Network 100 is heterogeneous as it includes both IP and OSI links or logical connections. Network 100, includes a plurality of hosts or end stations 106 (hosts 106(1), 106(2), . . . 106(11)—collectively hosts 106) and 108 (hosts 108(1), 108(2) collectively hosts 108) communicating via routers 102 and 104. Hosts 106 communicate using exclusively the IP protocol while hosts 108 use either exclusively the OSI protocol or a combination of the IP and OSI protocols. Routers 102 (hereinafter IP routers 102) provide routing for hosts 106 and, consequently, provide routing for only IP packets. In contrast, and as a result of servicing hosts 108, routers 104 (hereinafter IP/OSI routers 104) provide for the routing of both IP and OSI packets. As noted above, embodiments of the present invention provide for the routing of only IP packets (i.e., an IP router 102) of network 100 until an OSI trigger (e.g., an ESH or ISH packet) is received. As a result, when an OSI trigger is received by an IP router 102 the router becomes an IP/OSI router 104 (as described below). This transformation from an IP router 102 to an IP/OSI router 104 enables the transformed router to route any OSI packets that may be received.

Hosts 106 may from time to time receive packets transmitted by another host 108 that were in compliance with the OSI protocol. As is described below, these OSI packets may be encapsulated in IP (or, alternatively, using the Generic Router Encapsulation protocol). However, to be able to "understand" the contents of packet, a host 106 may run the upper layers of the OSI protocol. However, hosts 106 will not issue OSI packets (i.e., hosts 106 may be able to only "read" OSI packets but not generate OSI packets). Hosts 106 may maintain a database of the network addresses of those hosts 108 from which OSI packets have been received. If a packet needs to be issued by a host 106 to a network address identified in its database as being a host 108, these packets may be generated using the Generic Router Encapsulation protocol.

Routers 102, 104 are adapted to receive computer software or instructions from computer readable media 110. Computer readable media 110 may contain, for example, software, computer applications (including, for example, sub-routines corresponding to the operations illustrated in FIGS. 3, 4, 5, 6 or 7), computer data and the like. While computer readable media 110 is illustrated as a computer diskette, it could equally be a tape, memory chip, or other removable or non-removable computer readable medium. Furthermore, the computer readable media 110 may be a remote media, such as the memory of a remote computer, and be downloaded over a suitable link such as a over a network (e.g., network 100), dedicated data link, or the like.

In a conventional OSI network, network 100 would be considered a single domain with hosts 106, 108 being end systems forming part of areas 112 identified and bounded by the dotted outlines. Accordingly, network 100 (e.g., a domain) would include four areas 112A, 112B, 112C and 112D. Area 112A would include two level 1 routers 102A and 104A and one level 2 router 104B and a plurality of hosts/end systems 106(1), 106(2), 106(3), 106(4) and 108(1). Area 112B includes a single level 2 router 102B in communication with a plurality of hosts/end systems 106(5), 106(7) and 106(8). Areas 112C includes a single level 2 router 102C and hosts 106(9), 106(10) and 106(11). Area includes a single level 2 router 104C and hosts 106(5) and 108(2). However, network 100 is not a conventional OSI network.

Network 100 is predominately an IP network. That is, most packets transmitted are IP packets with most hosts 106, 108 transmitting IP packets. Routers 102, 104 may be conventional IP routers (e.g., Nortel Networks' Baystack Access Node Router) which are modified to perform the functions described herein.

In operation, network 100 acts as a conventional IP network with hosts 106, 108 generating and transmitting IP data packets destined for other hosts 106, 108. These transmitted data packets are received by routers 102, 104 which route the IP packets to the destination host in a conventional manner. All routers 102, 104 initially run software implementing the IP routing protocol resulting in the creation and maintenance of an IP routing table. However, unlike conventional IP networks, some hosts, such as hosts 108, may be running software implementing the OSI protocol (either alone or in combination with IP routing software). As a result, these OSI hosts 108 generate and transmit data packets complying with the OSI standard. These OSI packets may be destined for another host 108 which may also be running the OSI protocol, or, alternatively, the data contained within the OSI packet may be destined for a host 106 which only runs the IP protocol. As a consequence, some routers (i.e., IP/OSI routers 104) also run software implementing portions of the OSI routing protocol so that these OSI packets may be properly routed to the desired destination.

IP/OSI routers 104 may establish and maintain conventional OSI adjacencies and OSI quasi-adjacencies (described below) simultaneously. Conventional OSI adjacencies (which may ES-IS or IS-IS adjacencies) exist between an IP/OSI router 104 and either another IP/OSI router 104 or a host 108 whenever there is a direct data link between two devices (i.e., a link with no intervening network entities (NEs)) and the link (i.e., the circuit) is dedicated to OSI traffic only (i.e., no IP traffic).

A quasi-adjacency is similar to an OSI adjacency. However, unlike an OSI adjacency, two network entities (e.g., two IP/OSI routers 104 or an IP/OSI router 104 and a host 108) need not share a common data link but need only communicate with each other over network 100. A quasi-adjacency will identify a logical connection (e.g., a routing path which may include a port and destination network address used by a first NE to route packets to a second NE, the first and second NEs forming a quasi-adjacent pair of NEs). A quasi-adjacency will exist between two entities (e.g., two IP/OSI routers 104, an IP/OSI router 104 and a host 108) when both entities are running software implementing the OSI routing protocols and the entities are the closest entities that require the establishment the routing and forwarding of OSI data packets. In other words, a quasi-adjacency may exist when: (1) there is a path established between OSI NEs which path has the fewest number of intervening IP routers between the NEs (as compared with other paths between the OSI NEs); or (2) two OSI NEs are adjacent (i.e., there is a direct data link between the two OSI NEs) but the data link is used for IP packet traffic.

For circuits identifying an adjacency (i.e., the circuit is dedicated to OSI packet transmissions) IP/OSI router 104 will transmit conventional OSI packets on these circuits. If, however, a circuit identifies a quasi-adjacency (i.e., the circuit is used for IP packet transmissions—hereinafter "quasi-circuits"), a router 104 may use these quasi-circuits to transmit and receive encapsulated OSI packets. The OSI packets may be encapsulated in a conventional IP packet, using the Generic Router Encapsulation (GRE) protocol (as detailed in RFC 1701, the contents of which are hereby incorporated herein by reference), or using other methods including propriety extensions to the IP or OSI packets.

Figure 2:
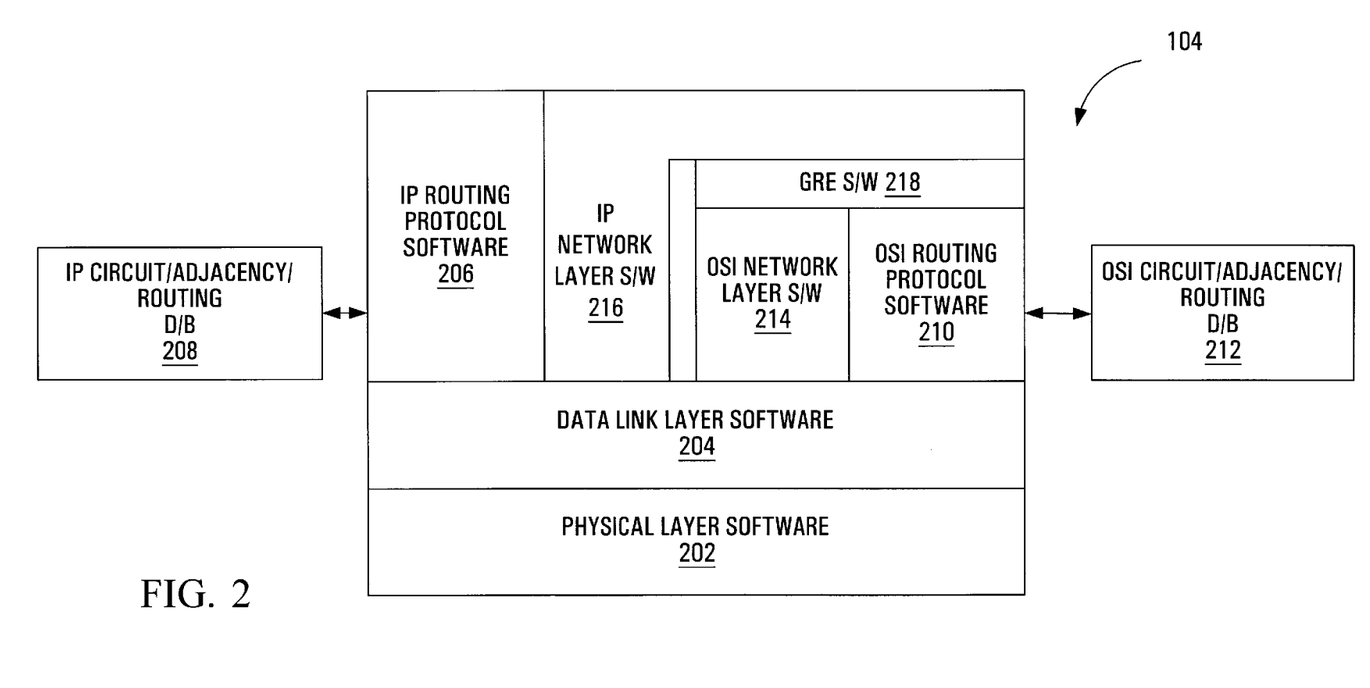
FIG. 2 is a block diagram of the software architecture of a router of FIG. 1.

FIG. 2 illustrates, in block diagram form, the software architecture which may be implemented in IP/OSI router 104. As will become apparent from the description below, IP routers 102 are similar to IP/OSI routers 104 except that IP routers 102 do not run any OSI related software. IP/OSI routers 104 (and IP routers 102) include physical layer software 202, data link layer software 204, IP network layer software 216, OSI network layer software 214 and GRE software 218, IP routing protocol software 206 and IP circuit, adjacency and routing database 208 (hereinafter IP routing database 208). Each IP/OSI router 104 (unlike IP routers 102) also runs OSI routing protocol software 210 and maintains an OSI circuit, adjacency and routing database 212 (hereinafter OSI routing database 212) which also logically sit on top of data link and physical layer software components 204, 202, respectively.

OSI network layer 214 may implement the Connention-less Network Protocol (CNLP) defined in ISO 8473 and the contents of which hereby incorporated herein by reference. IP network layer 216 may implement the IP described in RFC 791, the contents of which are hereby incorporated herein by reference.

IP routing software 204 (which may implement the protocol described in RFC2328, the contents of which are hereby incorporated herein by reference) and IP routing database 208 logically sit on top of the data link layer and physical layer software components 204, 202, respectively. Similarly, conventional IP and OSI network layer software 216, 214, respectively, are also logically above data link layer and physical layer software components 204, 202. GRE software 218 provides for communication between IP network layer software 216 and OSI network layer and OSI routing protocol software 214, 210.

IP routing protocol software 206 implements the IP routing protocols and the functions described herein that are ascribed to this software component. Similarly, OSI routing protocol software 210 implements the OSI routing protocols and the functions described herein that are ascribed to this software component.

IP routing database 208 provides conventional IP circuit, routing, adjacency and link state advertisement (LSA) information. IP circuit information identifies IP circuits available to a network element and the state of those circuits. IP adjacency information identifies other network elements with which communication may proceed and the IP circuit (s) that may used for any such communication. IP routing information identifies all reachable network elements including those identified by the IP adjacency table. The IP routing information that may be created using, for example, the Open Shortest Path First (OSPF) routing protocol (detailed in RFC 2328) or other routing protocols known in the art. As is known to those skilled in the art, an entry in a circuit table (i.e., a circuit entry in IP routing database 208) has a state associated with each entry (e.g., "up", "down" or "testing").

OSI routing database 212 contains circuit, quasi-circuit, adjacency, quasi-adjacency, routing and LSP information relating to the circuits, quasi-circuit, adjacencies, quasi-adjacencies and routes which can be used by the IP/OSI router 104 to communicate with the IP/OSI router's nearest neighbours and those hosts 108 serviced by IP/OSI router 104. As is known to those skilled in the art, an entry in a circuit table (i.e., a circuit entry in OSI routing database 212) has a state associated with each entry (e.g., "up", "down" or "testing").

GRE software 218 implements the GRE protocol and enables communication between OSI network layer 214/ OSI routing protocol software 210 and IP network layer 216. GRE software 218 provides a data link layer-like services to OSI network layer 214 OSI routing protocol software 210 using the services of the IP network layer 216 enabling OSI packet transmission over the IP infrastructure.

Link layer software 204 provides for the reliable transport of information across physical layer software 202. Physical layer software 202 provides for the transmission of a bit stream over the physical medium and deals with the mechanical, electrical, functional and procedural characteristics in providing access to the physical medium.

Additional management software to establish and maintain IP and OSI circuits may also be employed but is not shown.

Figure 3:
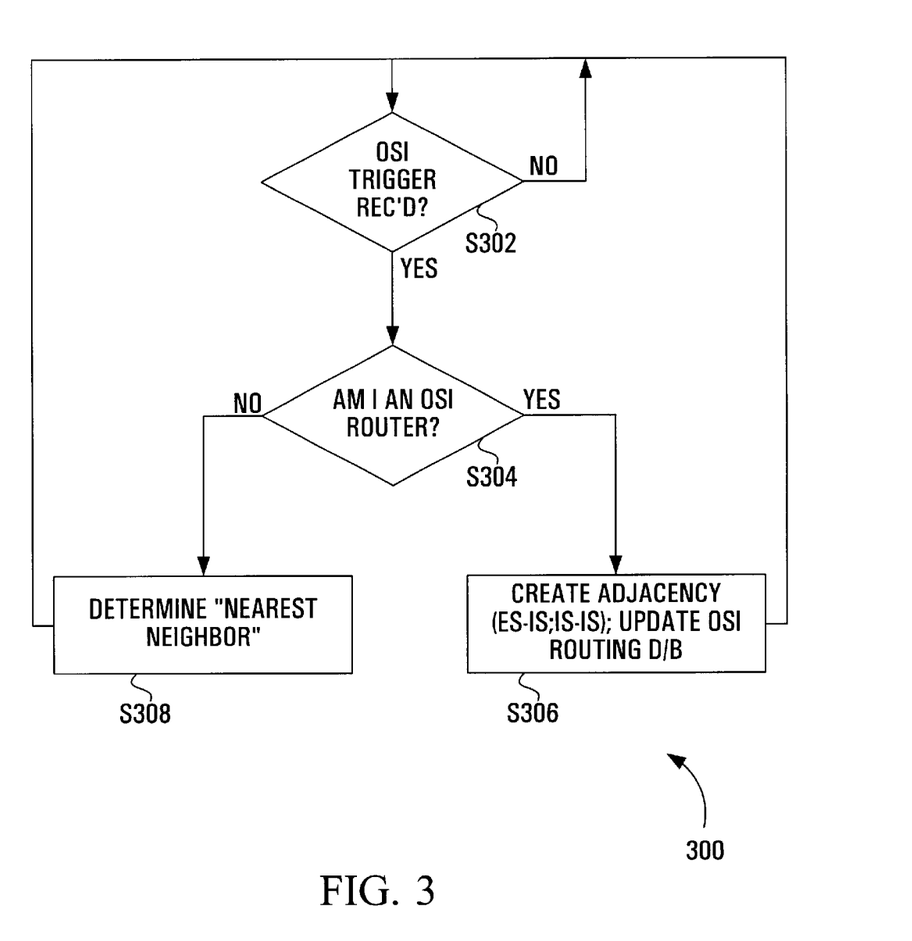
FIG. 3 is a flow chart of a first set of operations embodying aspects of the invention and performed by a router of FIG. 1.

FIG. 3 illustrates operations 300 which are being performed by routers 102, 104. As illustrated, routers 102, 104 continually assess whether an OSI trigger has been received (S302). An OSI trigger may be any indication that an OSI adjacency is being sought. For example, the receipt of an ISH or ESH (if an adjacency has not already been established) may be an OSI trigger. An attempt to manually configure an OSI adjacency with a router 102, 104 is also a trigger. If a router receives an OSI trigger and the router does not have a list of other routers capable of handling (i.e., receiving and routing) OSI packets (S304) (i.e., it is an IP router 102), then the router 102 determines other entities (i.e., routers 104) which are capable of routing OSI packets by performing a "Nearest Neighbour" operation S308 (described in greater detail below with reference to FIGS. 4, 4A and 4B). After performing operation S308 the IP/OSI router 104 which received the OSI trigger is now able to receive and route OSI compliant packets.

If, on the other hand, the OSI trigger receiving router does have a list of other routers capable of handling an OSI packet (i.e., the router receiving the packet is an IP/OSI router 104) then OSI routing database 212 of router 104 may require updating (S306). Updating of OSI routing database 212 will be required if an adjacency or quasi-adjacency identifying the circuit between the triggering entity and IP/OSI router 104 does not already exist in OSI routing database 212. That is, OSI routing database 212 will be updated with information corresponding to the circuit associated with the adjacency or quasi-adjacency being sought.

Once the nearest neighbours have been determined or OSI routing database 212 has been updated as necessary, IP/OSI routers continue to perform operations 300.

Figure 4:
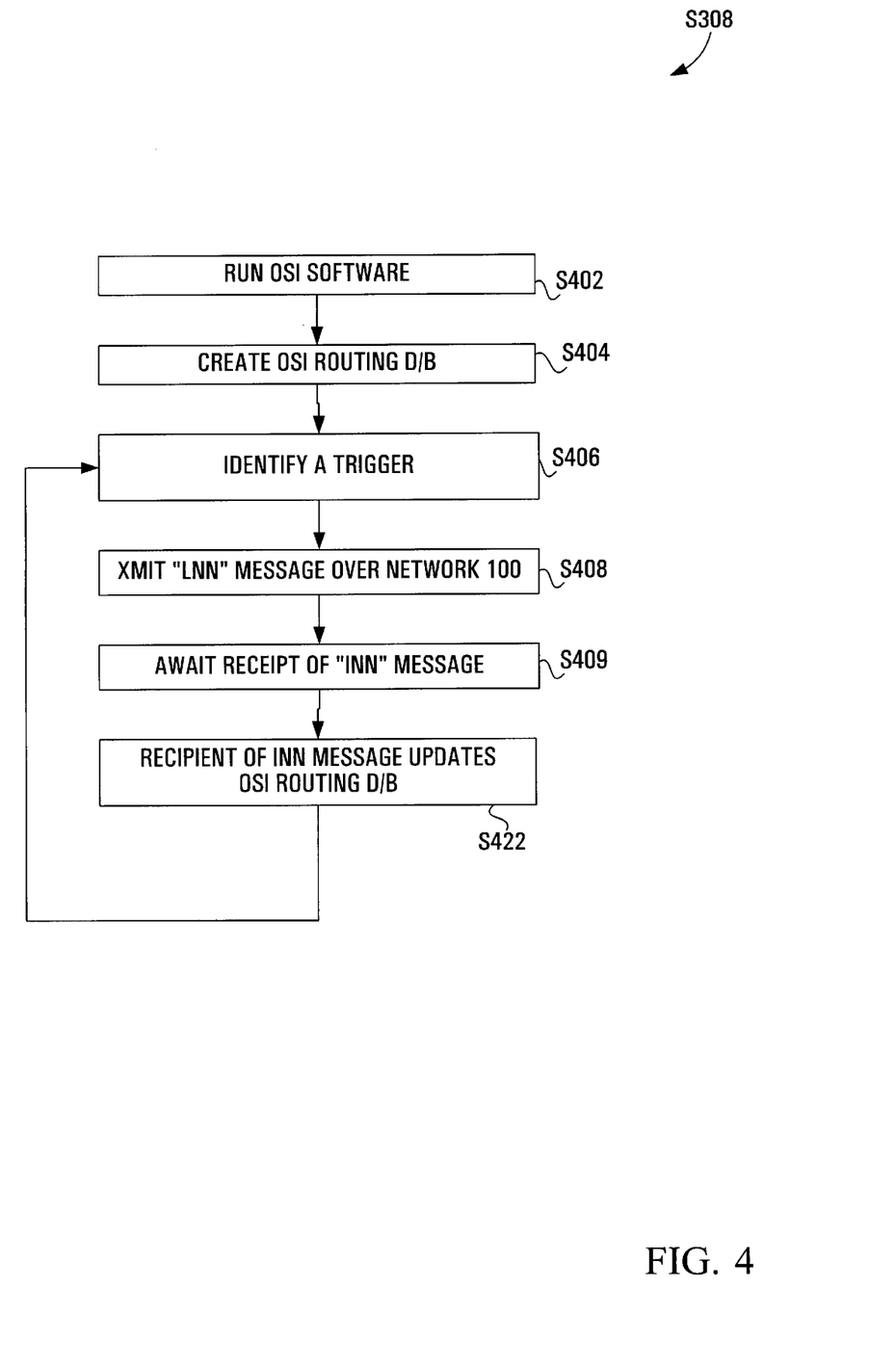
FIG. 4 is a detailed flow chart of a first portion of the first set operations illustrated in FIG. 3.
Figure 4A:
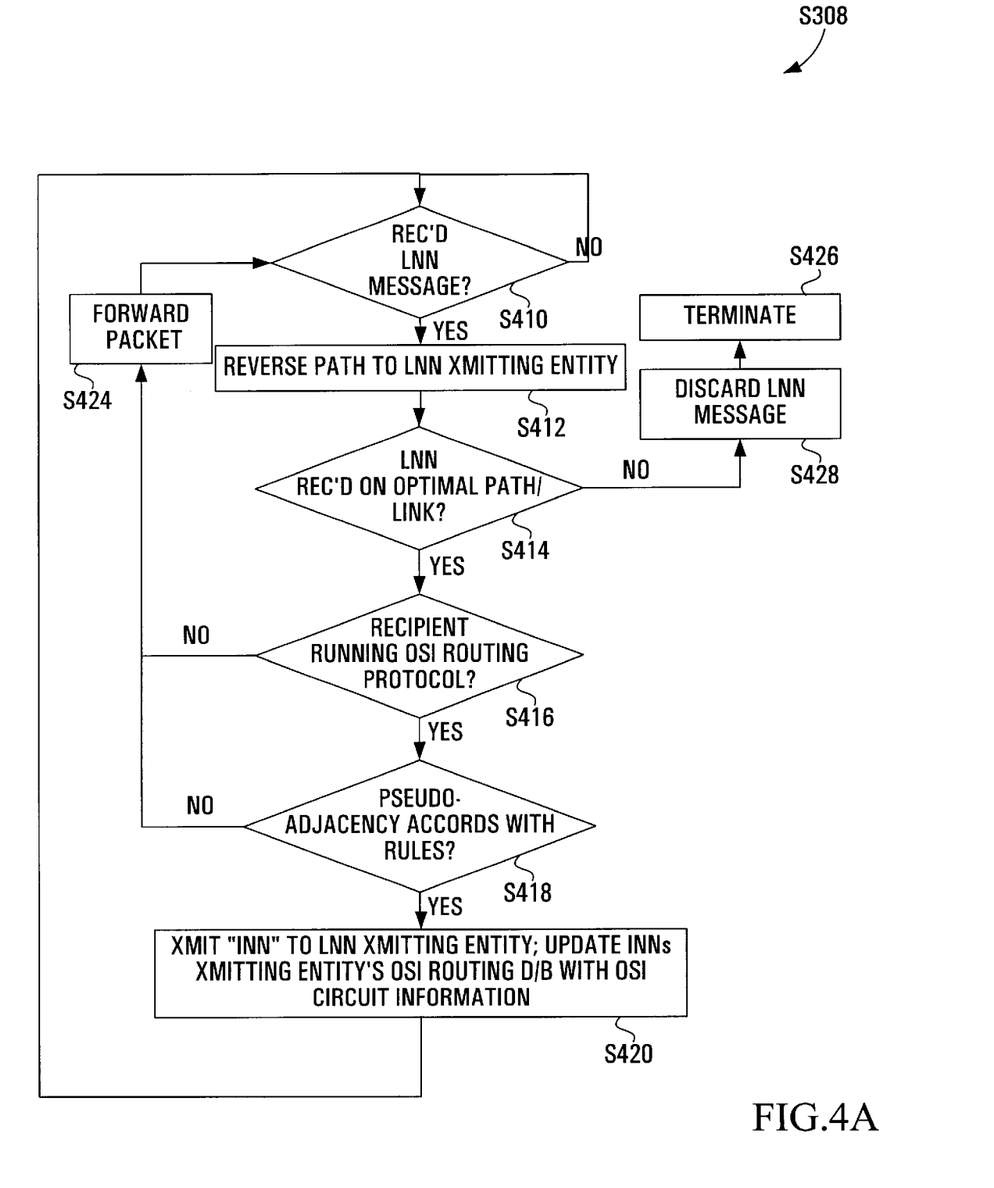
FIG. 4A is a detailed flow chart of a second portion of the first set operations illustrated in FIG. 3.

FIG. 4 illustrates in greater detail a portion operation S308 in which a router is attempting to determine its nearest neighbours. FIG. 4A illustrates in greater detail the responses of network elements to a router issuing messages in an attempt to locate its nearest neighbours.

Operation S308 is performed whenever an IP router 102 (i.e., a router running only the IP routing protocol) or IP/OSI router 104 receives an OSI trigger. An exemplary heterogeneous packet data switched network 440 (shown in FIG. 4B), which may be a sub-network of network 100 (FIG. 1)

is referenced during the detailed description of FIGS. 4 and 4A. However, as will be appreciated by those of ordinary skill in the art, the operations illustrated in FIGS. 4 and 4A are not limited to network 440 illustrated in FIG. 4B.

Figure 4B:
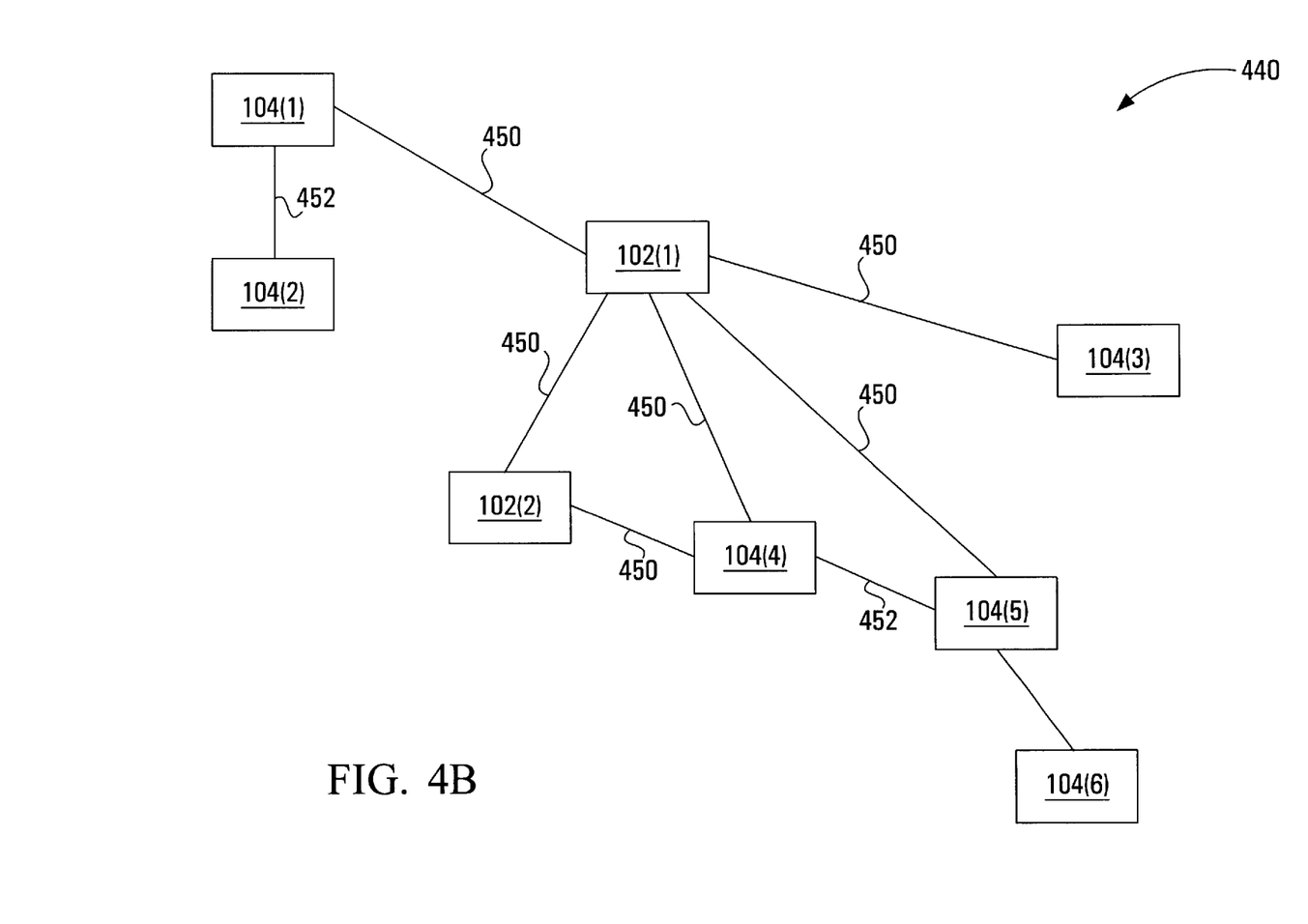
FIG. 4B is a block diagram of a packet switched data network including routers embodying aspects of the present invention and may form part of the network of FIG. 1.

Network 440 comprises a plurality of IP/OSI routers 104(1), 104(2), 104(3), 104(4), 104(5) and 104(6) and a plurality of IP routers 102(1) and 102(2). Routers 102, 104 of network 440 are in communication using IP links 450 or OSI links or circuits 452.

Initially, an IP router 102 commences running OSI routing protocol software 210 (S402) which may be stored in memory forming part of IP router 102. As a result, IP router 102 is transformed into an IP/OSI router 104(1). Router 104(1) is now simultaneously running software implementing the IP and the OSI routing protocols. Moreover, as described in greater detail below, IP routing database 208 (FIG. 2), initially created by IP router 102, will be used by both the IP and OSI protocol software 206, 210 (FIG. 2), respectively.

OSI and IP protocol software 210, 206 may exchange data using a variety of techniques. For example, both protocols may communicate using Logical Link Control encapsulation (defined in IEEE 802.3 the contents of which are hereby incorporated herein by reference) using the same data link layer 204 (FIG. 2). Alternatively, for OSI data packets destined for IP routing protocol software 206 from OSI routing protocol software 210, OSI routing protocol software 210 may encapsulate the OSI packet using the GRE protocol which can then be transmitted (i.e., transferred) to IP routing protocol software 206 using GRE software 218. GRE software 218 will apply the appropriate GRE header and then transmit the GRE packet to IP network layer 216 for transmission. Similarly, IP packets destined for the OSI routing protocol software 210 from IP routing protocol software 206 may be encapsulated using the GRE software 218 which removes the GRE header and transmits the packet (now stripped of its GRE header) to OSI software 210. It should be noted that while IP/OSI router 104(1) is described as a router it could also, for example, be implemented by a portion of any entity or network element which performs the functions described herein.

Once OSI software 210 has commenced running (S402), IP/OSI router 104(1) will create OSI routing database 212 (S404)—if not already created. It should be noted that steps S402 and S404 could be reversed in alternative embodiments. As will be appreciated, it is conventional for OSI routing database 212 to be created through, for example, manual provisioning, prior to the running of OSI software 210. IP/OSI router 104(1) also creates an entry in OSI routing database 212 (which either was just created or existed previously) which identifies the adjacency or quasi-adjacency associated with the circuit being sought by the entity which triggered operations 300 (e.g., the transmitter of the ESH or ISH). Once a circuit has been identified, router 104(1) transmits across network 100/440 (using, for example, an IP broadcast message) a "Locate Nearest Neighbour" (LNN) message which may be an IP packet (S408). The LNN message indicates to receiving routers 102, 104 that transmitting router 104(1) is attempting to locate its nearest OSI neighbours that are also running the OSI routing protocol. The LNN message may also indicate additional information about router 104 similar to that provided in conventional IS level 1 or level 2 networks such as, for example, maximum number of area addresses, ID length, authentication information, IS type (e.g., whether an IP/OSI router 104 is acting as a level 1 IS or a level 2 IS), area address list, maxsize (as defined in ISO 10587—the contents of which are hereby incorporated herein by reference, section 8.2.3, clause (c)), etc. If router 104 has just established OSI routing database 212 then the LNN message will be flooded across network 100 using all of the IP data links of router 104. In the instance where an LNN message is being transmitted to only update OSI routing database 212, the LNN message may be transmitted across network 100 to destinations not already represented in OSI routing database 212 (S408). For exemplary purposes, in network 440, the LNN message is flooded across all links 450, 452 communicating with router 104(1).

IP/OSI router 104(1) will then await receipt of an "I am a Nearest Neighbour" (INN) from other network elements that have received and responded to the LNN message issued in S408 (S409). Upon receipt of an INN message, IP/OSI router 104(1) will update its OSI routing database 212 with the circuit information. It is assumed in the further description of the INN message transmissions that an element receiving an INN message will cause a new circuit entry to be created in OSI routing database 212 with the circuit state set to "up". In an alternative embodiment where OSI software 210 does not support dynamic circuit entry in OSI routing database 212, a certain number of entries may be reserved in a "down" state and, upon receipt of an INN message, set the state for the appropriate entry to "up".

If a router 102, 104 receives an LNN message (S410), the receiving router 102, 104 will perform a reverse path check in S412 to assess whether the LNN message was received on the shortest path (i.e., the most direct or optimal route) (S414). If the received LNN message was not received on the optimal path/link (S414), the LNN message is discarded (S428) and the router 102, 104 awaits for additional LNN messages (S410).

The assessment and determination of whether a LNN message was received on the shortest path can be made by accessing IP routing database 208 (FIG. 2) of the receiving router 102, 104 and performing a routing table look-up. The routing table look-up will compare the port address on which the receiving router 102, 104 actually received the LNN message with the port address stored in IP routing database 208 which is associated with the network address (contained within the data packet containing the LNN message) of the transmitting IP/OSI router 104.

IP routing database 208 at the receiving entity, as is known to those of ordinary skill in the art, contains optimal routing information which, in part, associates the network address of a transmitting entity (e.g., transmitting IP/OSI router 104) with a port address at the receiving entity (e.g., receiving IP or IP/OSI routers 102, 104). A data packet which follows the optimal routing path between the transmitter and the receiver will be received at a port address of the receiver which is the same as the port address stored in the receiver's IP routing database 208.

Accordingly, if the LNN message transmitted by transmitting IP/OSI router 104 is received by a receiving router 102, 104 on a port different from the port address indicated in the IP routing database 208, the received LNN message did not arrive via the optimal path. Accordingly, an IP router 102 (i.e., a router not running the OSI routing protocol—S416) receiving the LNN message need not forward the message to any other router since a router 102, 104 receiving such a forwarded LNN message would receive the message via a non-optimal route. Accordingly the LNN message will be discarded (S428). Similarly, an IP/OSI router 104 will also discard any LNN messages received on a non-optimal path (S414, S428).

For example, in exemplary network 440, upon the issuance by IP/OSI router 104(1) of an LNN message, routers 102(1), 104(2) will perform reverse path check S412. Both routers 102(1), 104(2) will determine that the LNN message was received on an optimal path. Consequently, IP/OSI router 104(2), as it is running the OSI routing protocol, will perform operation S418. In contrast, router 102(1), although a recipient of the LNN message on the optimal path (S412, S414), is not an IP/OSI router (S416) and, therefore, will forward (S424) the LNN message to the routers with which it communicates (i.e., routers 102(2), 104(3), 104(4) and 104(5)). Had router 102(1) received the LNN message on a non-optimal path, router 102(1) would have discarded the received LNN message (S428) and terminated operations S308 (S426).

However, as router 102(1) did receive the issued LNN message on an optimal path, the LNN message is forwarded to the routers with which it communicates (S424). Router 102(2), on receipt of the forwarded LNN message would similarly forward the LNN message onward (with the exception that the LNN message would not be forwarded onto the transmitter of the forwarded message—that is, back to router 102(1)). As a result, router 104(4) will receive the LNN message twice—albeit on two separate ports (once from router 102(1) and a second LNN message from router 102(2)). Router 104(6) would not receive the LNN message since no router would be forwarding this message on to router 104(6).

As persons skilled in the art will appreciate, routers 104(2), 104(3) and 104(5) after performing the reverse path check, will determine that the received LNN message was received on the optimal path/link. In contrast, router 104(4), which received two LNN messages, will determine that only the first one (received from router 102(1)) will have been received on an optimal path/link. The second LNN message received by router 104(4) (forwarded by router 102(2)) will not have been received on the optimal link and so will be discarded.

A router 102, 104 not receiving an LNN message continues to operate as normal (i.e., continued performance of operations 300—FIG. 3) by terminating operation S308 (S426).

On receipt of an LNN message (issued in S410), a receiving router 102, 104 having assessed and determined in the LNN message was received on an optimal route, determines (S416) if it is running software implementing the OSI routing protocol 210 (i.e., whether the receiving router is an IP/OSI router 104). If the receiving router is running OSI software 210 (S416) then there exists the possibility of that an adjacency or a quasi-adjacency (described above) could be established between the transmitting and receiving IP/OSI routers 104. Otherwise, the receiving router is an IP router 102 (S416). Accordingly, an IP router 102 receiving an LNN message on an optimal route (S412, S414, S416) will forward the LNN message on to other routers 102, 104 (S424).

If the LNN message did traverse network 100 along the optimal path and was received by an IP/OSI router 104, an IP/OSI router 104 responds by determining if a quasi-adjacency should be established by ensuring that the quasi-adjacency would comply with any rules stored by router 104 (S418). For example, if the entity transmitting the LNN message in S408 is acting as a level 1 router in a first area (which may be indicated by the contents of the LNN message) and the entity receiving the LNN message is also a level 1 router but in a second area, then no quasi-adjacency should be created due to an area address mismatch. If it is determined in S418 that a quasi-adjacency should not be created, the receiving entity forwards the received LNN message (S424) to other potential nearest neighbours. On the other hand, if it is determined that a quasi-adjacency should be created (S418), the receiving router 104 responds by transmitting an INN message to transmitting IP/OSI router 104 (S420). Further, the receiving IP/OSI router 104 will update its own OSI routing database 212 by performing operations 500 (described below with reference to FIG. 5).

Assuming that routers 104(2), 104(3), 104(4) and 104(5) qualify under S418, router 104(2) will create a conventional adjacency with router 104(1) (as routers 104(1) and 104(2) are in direct communication and link 452 is dedicated to OSI traffic) and routers 104(3), 104(4) and 104(5) will create quasi-adjacencies with router 104(1).

Upon receipt of an INN message, a transmitting IP/OSI router 104 will update its OSI routing database 212 with quasi-circuit information identifying the communication link associated with communication between itself and the entity that transmitted the INN message. Accordingly, router 104(1) will create an adjacency with router 104(2) and quasi-adjacencies with routers 104(3), 104(4) and 104(5). The circuit that is created is a point to point type circuit that is defined in ISO 10589 and has all the same attributes as a normal OSI point to point circuit. At this point OSI routing will operate as normal as attempt to form an adjacency across the new circuit.

In some cases the INN may be lost and, therefore, may not be received by the initiator of the LNN message. To reduce the risk of this happening, the INN response may be issued (i.e. sent out) a fixed number of times. A default (e.g., issuing the INN response three times) may be configured and thereafter adjusted from time to time through network administration to improve network performance. In the case where all INN messages issued are lost, the sender of the INN message will have created the quasi-circuit and will have attempted to establish an OSI adjacency across this quasi-circuit. The initiator of the LNN message will eventually receive OSI messages over a quasi-circuit. It is preferred that the initiator treats the receipt these packets in the same way it would treat the receipt of an INN message—by creating the quasi-circuit and accepting the quasi-adjacency.

As will be appreciated, in a network with relatively small numbers of OSI NEs and a relatively large number of IP NEs, the exemplary embodiments provide that only those routers needing to run the OSI routing protocol will do so which is in contrast to conventional networks providing for both IP and OSI routing which have all routers running both protocols. Use of the techniques described herein reduces the amount of general overhead and traffic (on a network basis) and leverages the IP infrastructure already in place.

Once the quasi-circuit has been created in the OSI routing database 212, OSI routing protocol software 210 then operates as if this quasi-circuit is any normal circuit in OSI routing database 212. OSI routing software 210 will advertise to its nearest neighbours the costs associated with these adjacencies or quasi-adjacencies by performing operations 500 illustrated in FIG. 5. OSI routing database 212 may need to be updated whenever a new adjacency or quasi-adjacency is created (e.g., upon receipt of an INN message (S422), upon generation and transmission of an INN message (S420), or, if desired, whenever the costs—as stored in IP routing database 208 associated with the links used for communicating with the adjacent or quasi-adjacent neighbours change). Unlike conventional OSI routers, an IP/OSI router 104 will determine the costs associated with each adjacency or quasi-adjacency by referencing the cost information stored in the IP routing database (which may have been generated using the OSPF protocol).

When it is determined that OSI routing database 212 has been modified (e.g., created; updated through receipt of an INN message in S422—FIG. 4 or upon issuance of an INN message in S426—FIG. 4) (S502), OSI routing protocol software 210 will query IP routing database 208 (S504) for the costs of the link associated with the modification to OSI routing database 212 (i.e., only the costs associated with those link entries in the OSI routing database which have been recently modified will need to be determined). This operation is performed so that the "true" cost of a quasi-adjacency can be determined. To the OSI routing protocol software 210, each quasi-adjacency appears as a single hop. However, this is not necessarily correct. Accordingly, the true cost of quasi-adjacency can be determined by accessing the information stored in IP routing database 208. As described above, the query of the IP routing database 208 may be made periodically by issuing procedure calls from OSI routing into IP routing to gather cost of the various circuits. The procedure calls will retrieve the desired cost information from IP routing database 208 (S506). On receipt of the up-to-date cost information, OSI routing protocol software 210 will transmit LSPs over network 100 to those nearest neighbours that had their respective entries in the transmitting IP/OSI router's OSI routing database 212 modified (S510). Upon transmission of the LSPs, operations 500 will then terminate (S512).

Figure 5:
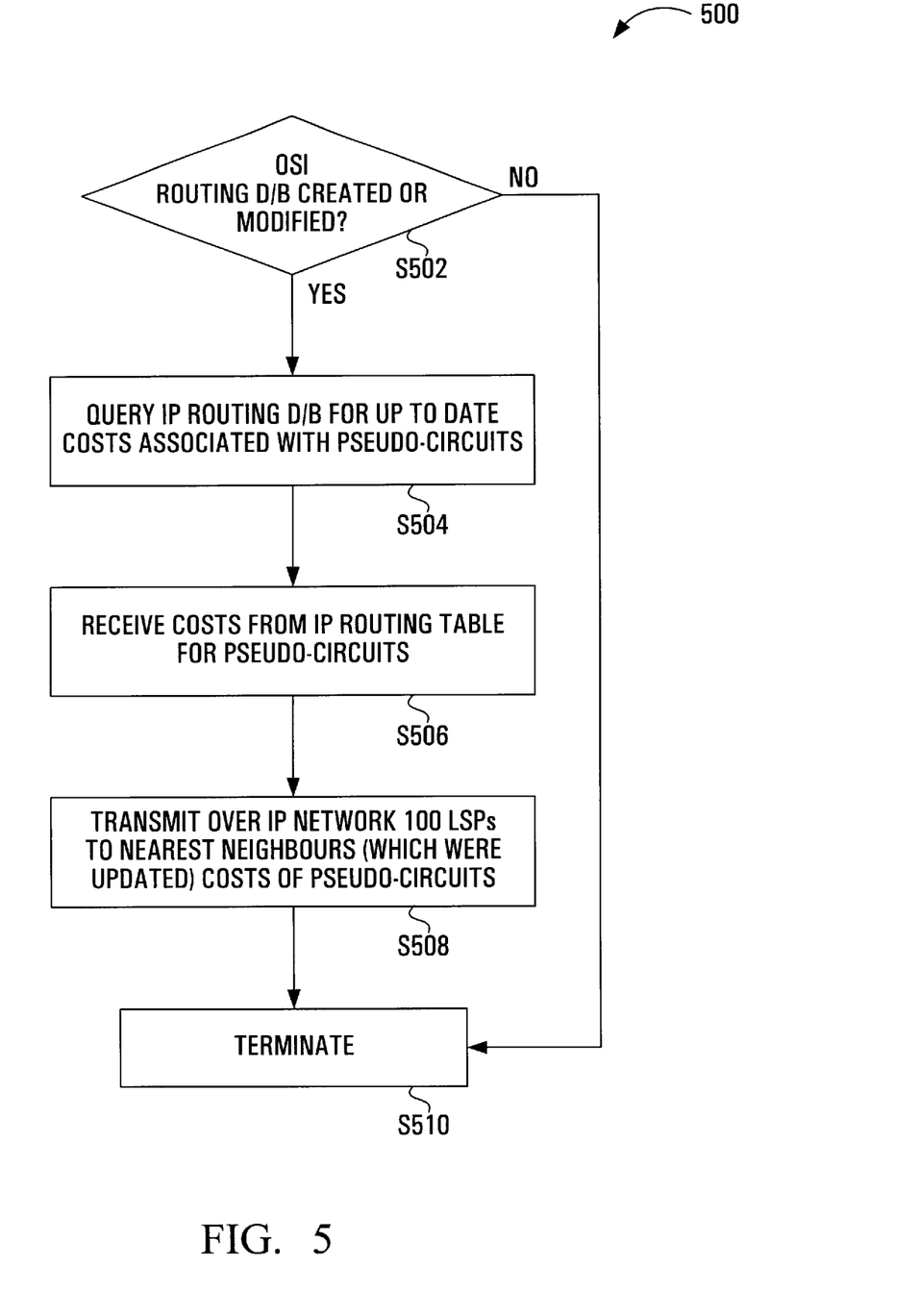
FIG. 5 is a flow chart of a second set of operations performed by the routers of FIG. 1.

Once an IP/OSI router has created or modified OSI routing database 212 (FIG. 2), by performing operations 500 (FIG. 5), IP/OSI router 104 will need to determine how to route incoming packets to hosts 106, 108 (i.e., NEs) that are not IP/OSI routers. FIG. 5 illustrates conventional OSI routing and forwarding operations. Hosts 108 (i.e., those end systems that generate and transmit OSI packets) will also need to be aware of OSI routers (i.e., IP/OSI routers 104) available for the routing of OSI packets. From an OSI perspective, this appears to be conventional once an adjacency has been established (as viewed from the IS-IS perspective) with the exception that OSI packets would be encapsulated into IP packets which are then routed over the IP network.

Figure 6:
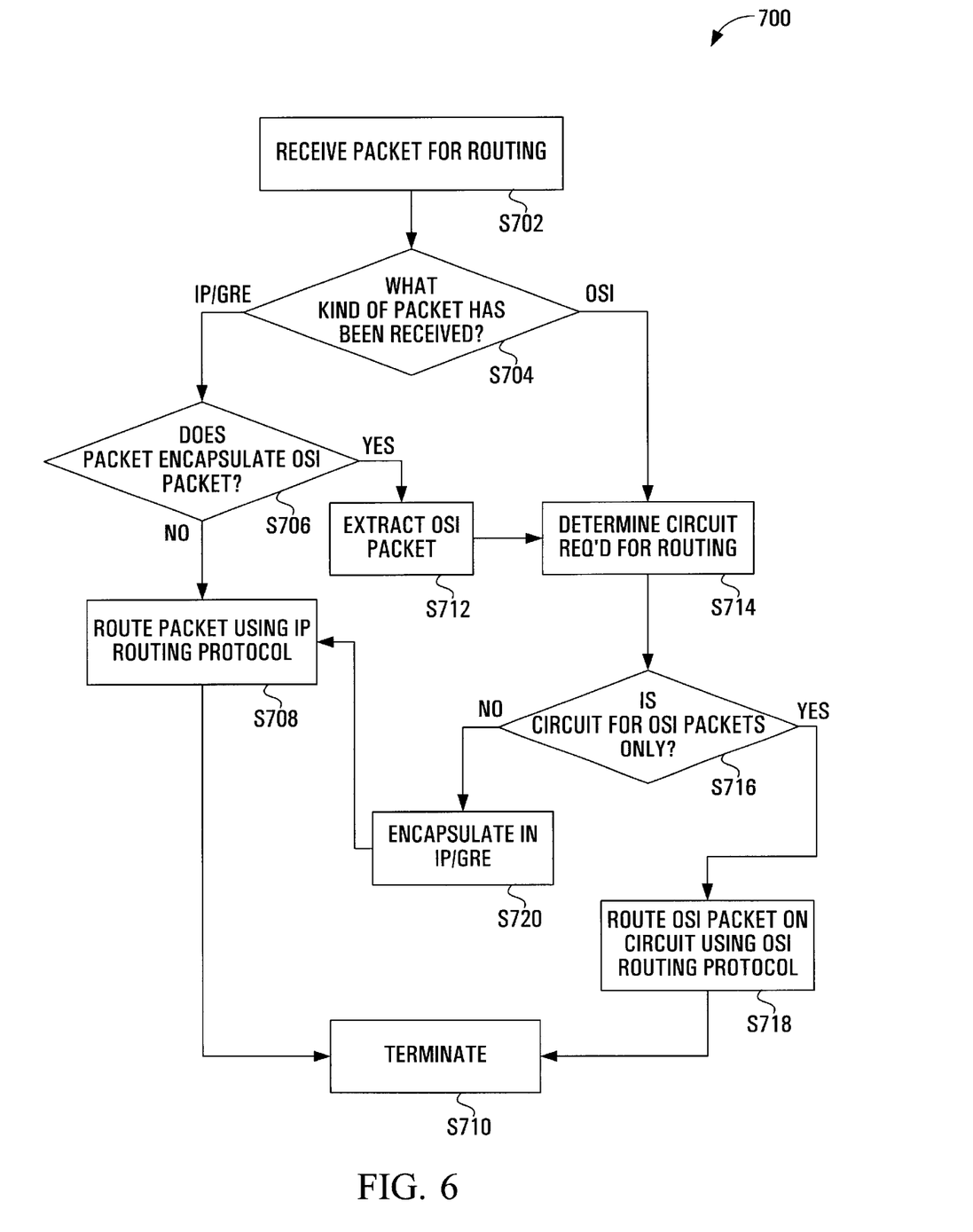
FIG. 6 is a flow chart of a third set of operations performed by the routers of FIG. 1.

FIG. 6 illustrates operations 600 which are performed by an IP/OSI router 104 on receipt of a data packet requiring routing. On receipt of a data packet (S602) IP/OSI router determines the type of the packet (i.e., whether the received packet is OSI compliant) (S604). If the packet is OSI compliant, the IP/OSI router accesses the OSI routing database 212 to determine a circuit or quasi-circuit which should be used for routing the received OSI packet (S614). The routing determination will take advantage of previously established adjacencies and quasi-adjacencies. Once a circuit or quasi-circuit has been identified (S614), IP/OSI router 104 determines whether the circuit or quasi-circuit identifies a link used for OSI packets exclusively (a circuit) or whether the circuit identifies a link used for IP packets (a quasi-circuit)(S616). If the identified circuit is for OSI packets exclusively, router 104 routes the OSI packet towards its destination on the identified circuit in a conventional manner (S618) and operations 600 terminate (S610). In the instance that the identified circuit is for IP packets (S616), IP/OSI router 104 (through operation of OSI protocol software 210—FIG. 2) will encapsulate the packet using the IP or GRE protocol (S620). The encapsulated OSI packet can then be routed over the network 100 in a conventional manner (S608).

If the packet received by router 104 is not an OSI packet (S602, S604), IP/OSI router 104 determines if the packet received (e.g., an IP or GRE packet) encapsulates an OSI packet (S606). If the received packet does encapsulate an OSI packet, the IP/GRE packet header is stripped from the packet (i.e., the OSI packet is extracted from the received packet) (S612) and the OSI packet is then routed as necessary (S614 S620). If the received packet is not an encapsulated OSI packet (S606) (e.g., an IP packet), IP/OSI router 104 routes the packet in the conventional manner over network 100 (S608) and operations 600 terminate (S610).

Any packets received by an IP router 102 should be IP packets only. Accordingly, IP router 102 may route received packets in a conventional manner. If desired, a check to determine that a received IP packet does not encapsulate an OSI packet could also be performed.

Operations 700 (FIG. 7) are performed by an IP/OSI router 104 to determine if a quasi-adjacency identifying a quasi-circuit should be torn down (i.e., removed from OSI routing database 212). Operations 700 are performed continuously or periodically and are used to test each quasi-adjacency set up during operations 300 (FIG. 3). If an IP/OSI router 104 continues to receive ESHs or ISHs on a particular circuit, IP/OSI router 104 determines that the quasi-adjacency should not be torn down (S702) and continues to perform operations 700 by testing the remaining quasi-adjacencies. After all quasi-adjacencies have been tested, and, if necessary, torn down, operations 700 may be repeated for all existing/remaining quasi-adjacencies.

Figure 7:
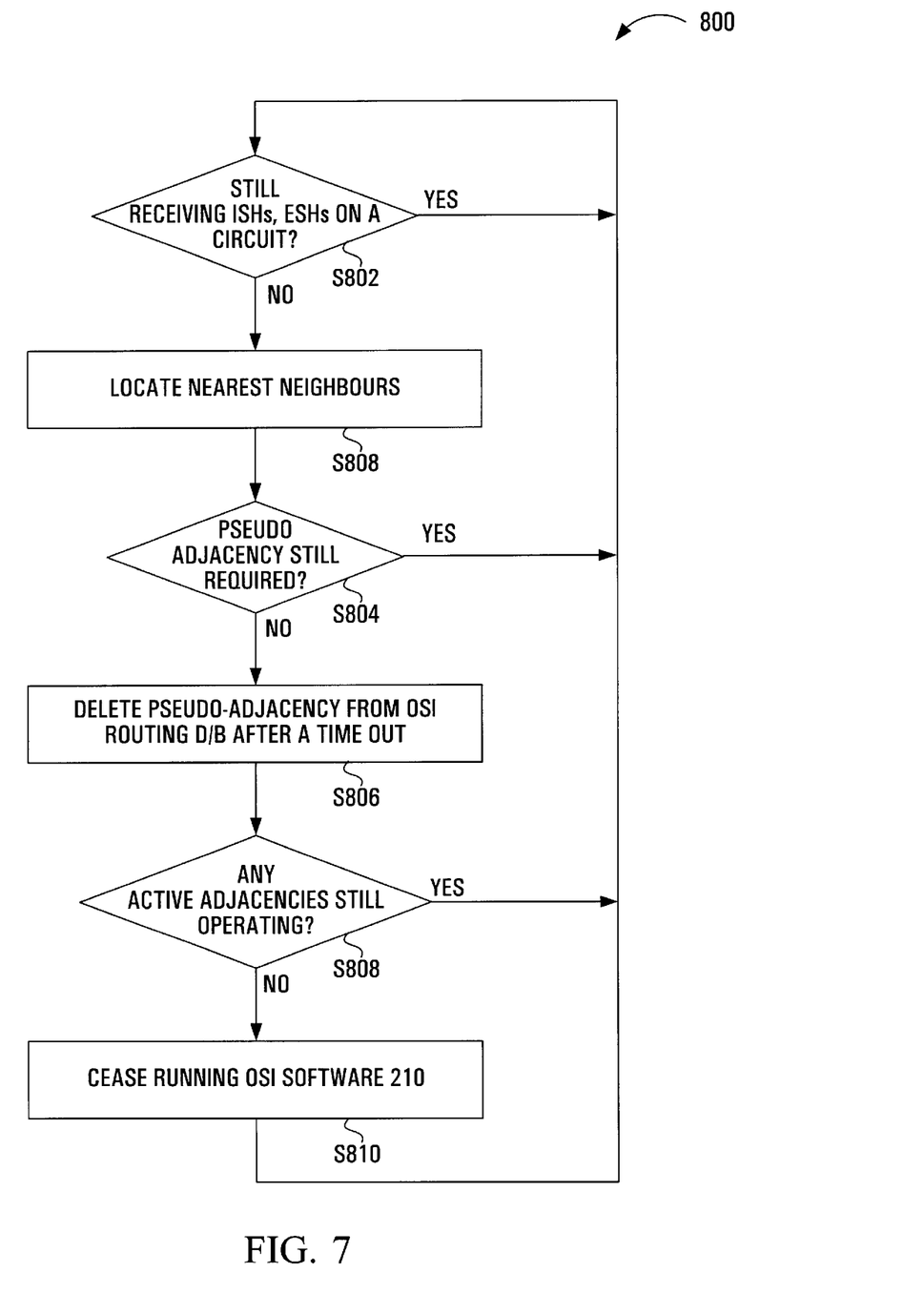
FIG. 7 is a flow chart of a fourth set of operations performed by the routers of FIG. 1.

If it is determined that the router 104 is no longer receiving ESHs/ISHs on a particular quasi-circuit (i.e., no ESHs/ISHs have been received in a configurable period of time) (S702), IP/OSI router 104 performs operation S308 (FIG. 3) to determine if the quasi-adjacency should be maintained (e.g., other routers may be dependent on a router 104 performing S308 for a particular "hop" in their transmissions). Once operation S308 has been performed, if an INN message is not received in reply indicating that the quasi-adjacency at issue should be maintained (S704), the quasi-circuit information associated with the quasi-adjacency is deleted from OSI routing database 212 (S706) after a period of time has elapsed (e.g. one hour). Use of a "time out" period ensures that a circuit is not deleted from OSI routing database 212 as a result of temporary instability in network 100. If, however, an INN message is received by the testing router 104 indicating that the quasi-adjacency at issue should be maintained, operations 700 re-commence by testing another quasi-adjacency (S706, S702).

If a quasi-adjacency is deleted in S706, IP/OSI router determines whether any quasi-adjacencies or conventional OSI adjacencies still exist and are still actively operating (S708). If there are no remaining quasi-adjacencies nor any remaining conventional adjacencies, OSI software 210 and its associated OSI routing database 212 may be terminated (i.e., OSI software 210 terminates operation and OSI routing database 212 is deleted) which would transform IP/OSI router 104 into an IP router 102.

Additionally, or alternatively, the OSI software 210 and its associated OSI routing database 212 may be terminated through other techniques. For example, OSI software 210 and its associated OSI routing database 212 may be terminated after a configurable time out period where no OSI packets have been received has elapsed. Software 210 and its associated OSI routing database 212 may also be terminated manually through operation intervention. Alternatively, software 210 and its associated OSI routing database 212 may be terminated using other optimization techniques.

As will be appreciated by those skilled in the art, the embodiments described above enable IP routers and networks to support the transmission and routing of OSI data packets. Moreover, use and reliance on the Internet Protocol enables a combined IP/OSI router to route OSI or IP packets throughout the network without being limited to a particular IP sub-network or domain/Asynchronous System. Further, use of IP enables IP/OSI routers 104 to provide multipoint or multicasting services without requiring any additional protocols being run resulting in performance penalties. Moreover, use of the IP routing tables enables the designation of a backup router. This latter capability provides for faster recovery than Integrated IS-IS.

As will be appreciated by those skilled in the art, other networking protocols (e.g., protocols other than OSI and IP) could also employ embodiments of the invention described herein with suitable modifications to the LNN message. Similarly, a heterogeneous network that is predominately used for OSI packets with some IP data traffic could employ embodiments of the invention described herein such that only those routers routing IP packets would need to execute the IP routing protocol (i.e., the embodiment would transmit IP over OSI rather than OSI over IP as described above). Suitable modifications to the LNN message may need to be made.

While one (or more) embodiment(s) of this invention has been illustrated in the accompanying drawings and described above, it will be evident to those skilled in the art that changes and modifications may be made therein without departing from the invention. All such modifications or variations are believed to be within the scope of the invention as defined by the claims appended hereto.

What is claimed is:

1. A method for routing data packets complying with a first routing protocol over a heterogeneous network complying in part with a second routing protocol, the method comprising:
   if a packet received complies with said first routing protocol, automatically switching from a first state characterized by only running said second routing protocol to a second state characterized by running said second routing protocol and running said first routing protocol simultaneously;
   determining, according to said first routing protocol, a destination on said heterogeneous network;
   routing said packet received to said destination on said heterogeneous network, said routing using said second routing protocol; and
   automatically switching back to said first state.

2. The method of claim 1 wherein said method is performed by a router and wherein said determining a destination comprises:
   establishing logical connections with other routers in said heterogeneous network using said first routing protocol, said other routers enabled to route packets complying with said first routing protocol.

3. The method of claim 2 wherein said first routing protocol is an Open Systems Interconnect (OSI) routing protocol and said second routing protocol is an Internet Protocol (IP) routing protocol.

4. The method of claim 3 wherein some of said logical connections established identify one of an OSI adjacency or a quasi-adjacency between said router and some of said other routers.

5. An Internet Protocol (IP) router forming part of a heterogeneous network formed, in part, by an IP network, said IP router adapted to:
   receive a packet conforming with a different protocol;
   automatically switching from a first state characterized by only running the Internet protocol to a second state characterized by running said Internet Protocol and running said different protocol simultaneously to determine routing for said packet received; and
   routing said packet over said IP network responsive to said routing determined whenever there is no end-to-end route through said heterogeneous network complying with said different protocol; and
   automatically switching back to said first state.

6. The IP router of claim 5 wherein said different protocol is Open Systems Interconnect (OSI) protocol.

7. The IP router of claim 6 wherein adaptation to determine routing for said packet received comprises:
   establishing adjacencies or quasi-adjacencies with other routers forming part of said heterogeneous network, said other routers enabled to route packets conforming with said OSI protocol; and
   determining a route for said packet received using said adjacencies or quasi-adjacencies established.

8. The IP router of claim 7 wherein said routing comprises:
   encapsulating said packet received into an IP packet; and
   routing said IP packet over said IP network.

9. A method for routing a packet according to first routing protocol over a heterogeneous network using a second routing protocol, said method comprising:
   receiving said packet;
   responsive to said receiving, automatically switching from a first state characterized by only running said second protocol to a second state characterized by running said second protocol and running said first routing protocol simultaneously;
   determining a route for said packet received using said first routing protocol and said second routing protocol;
   routing said packet received over said heterogeneous network according to said route determined; and
   automatically switching back to said first state.

10. The method of routing of claim 9 wherein said first routing protocol is the Open Systems Interconnect (OSI) routing protocol and the second routing protocol is the Internet Protocol (IP) routing protocol.

11. The method of routing of claim 10 wherein said method is performed by a router forming part of said heterogeneous network and said running said first protocol comprises:
   transmitting a message across said heterogeneous network complying with said second routing protocol so as to establish logical connections over said network with other routers forming part of said network, said other routers capable of routing first routing protocol compliant packets; and
   wherein said determining comprises identifying a route for said packet received, said route identified using said logical connections established.

12. A method for routing Open Systems Interconnect (OSI) compliant packets over an Internet Protocol (IP) data network with an IP router, said method comprising:
   receiving a triggering packet;
   responsive to receiving said triggering packet, automatically switching from a first state characterized by only running the Internet protocol to a second state characterized by running said Internet Protocol in addition to running an OSI routing protocol simultaneously on said IP router;

determining a route for said OSI compliant packets using IP routing information; and transmitting said OSI compliant packets over said IP data network in accordance with said route determined; and automatically switching back to said first state.

13. A computer readable media containing instructions to adapt an Internet Protocol (IP) router to:

on receipt of a triggering packet, automatically switch from a first state characterized by only operating the Internet routing protocol to a second state characterized by operation of the Internet routing protocol in addition to an OSI routing protocol simultaneously on said IP router;

determine a route for OSI compliant packets using IP routing information; and transmit said OSI compliant packets over an IP data network in accordance with said route determined.

* * * * *